M. LEONHARDT.
VALVE FOR FLUSHING TANKS.
APPLICATION FILED MAY 6, 1914.
1,206,786.
Patented Nov. 28, 1916.
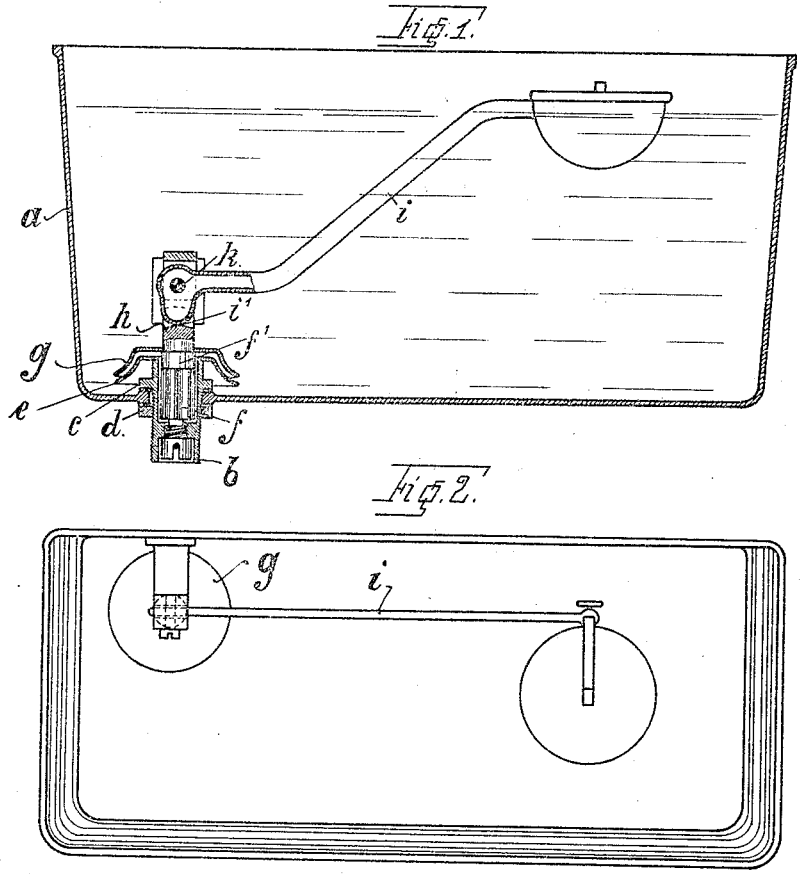
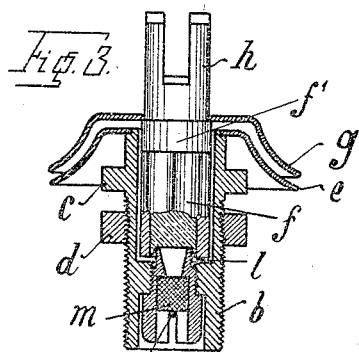

UNITED STATES PATENT OFFICE.

MAX LEONHARDT, OF DRESDEN, GERMANY.

VALVE FOR FLUSHING-TANKS.

1,206,786.  Specification of Letters Patent.  Patented Nov. 28, 1916.

Application filed May 6, 1914. Serial No. 836,823.

*To all whom it may concern:*

Be it known that I, MAX LEONHARDT, a subject of the German Emperor, residing at Dresden, Germany, have invented certain new and useful Improvements in Valves for Flushing-Tanks, of which the following is a specification.

The present invention relates to improvements in valves for flushing tanks and it is the purpose of the invention to provide a valve working almost noiselessly. With this end in view the valve body is provided with a flat distributing plate which has a concave bottom face and is located near the bottom of the cistern. The float lever engages a fork of the valve body in such a manner, that the valve body can move downwardly independently of the float lever. Beneath this first named distributing plate is a second plate attached to the valve body which corresponds in form to that of the first plate.

Into the water supply passage a cartridge consisting of a rolled strip of wire netting may be placed. Furthermore, it is of advantage for insuring a silent closure of the valve to make the valve body of a cylindrical shape, having a circular cross section so that when the valve is closed the cylindrical part engages in the valve casing and forms a close joint therewith. This arrangement permits a quick closure with very little noise. For preventing the float after being depressed by the valve body, from being pressed upwardly by the water at a very high pressure in the cistern, the fulcrum of the float lever is preferably arranged vertically or almost vertically above the valve body and the end acting on the valve body is made eccentric.

Reference is to be had to the accompanying drawings forming part of this specification, in which similar characters of reference indicate corresponding parts in all of the figures.

Figure 1 is a vertical longitudinal section through the valve. Fig. 2 is a plan view of the same. Fig. 3 is a vertical longitudinal section through the valve on an enlarged scale. Fig. 4 is a horizontal cross section through the wire netting within the inlet passage of the valve. Fig. 5 is a horizontal cross section through the valve.

Into the bottom of the tank $a$ is fitted the valve casing $b$ by means of a flange $c$ and a nut $d$. To the casing $b$ is secured the distributing plate $e$. The lower part of the valve body $f$ within the casing has a star-shaped cross section as shown in Fig. 5, while the upper portion $f^1$ of the valve body has cylindrical cross section as indicated in Figs. 1 and 3, and approximately fills the bore of the valve casing leaving only a small space between the moving parts in order to prevent sticking. The valve body carries also a distributing plate $g$ which in its form corresponds to the distributing plate $e$. At its upper end the valve body is forked as at $h$ and between the forks the end of the float lever $i$ is pivotally secured by a pin $k$. The cam-shaped end $k^1$ of the float lever acts upon the valve body in the manner of an eccentric so that during the uppermost position of the float the valve body is pressed down upon its seat $l$ by the end $k^1$ of the float lever, while during the lowering of the float the valve body is pressed upwardly by the pressure of the water, so that the cylindrical part of the valve body emerges from the bore of said body and the water can flow freely out of the valve casing. Beneath the valve seat $l$ a cartridge $m$ made of a strip of wire netting is placed into the valve casing. This cartridge $m$ is held in position by a pin $n$. For facilitating the exchange of the cartridge the valve seat together with that part of the valve casing in which the cartridge is placed, are screwed into the remaining part of the valve casing, so that the cartridge can readily be exchanged. The distributing plates $e$, $g$ serve to deflect the water emerging from the valve in a finely distributed and downwardly directed stream mixing almost noiselessly with the water already in the tank.

What I claim is:—

A flushing tank of the character described, comprising in combination, a tank, a valve casing in the bottom of said tank, means for securing said casing to said bottom, a long valve of star cross section sliding in said casing and closing against water pressure, a distributing plate secured to said casing, a second distributing plate immediately above said first named plate and secured to said valve, and a forked upper end of the valve engaged by a cam of the float lever.

In testimony whereof I affix my signature in presence of two witnesses.

MAX LEONHARDT.

Witnesses:
L. A. BERGHOLZ,
PAUL ARRAS.